April 28, 1925.
W. H. HIMES
1,535,605
AUTOMATIC WELDING MACHINE
Filed Jan. 26, 1921
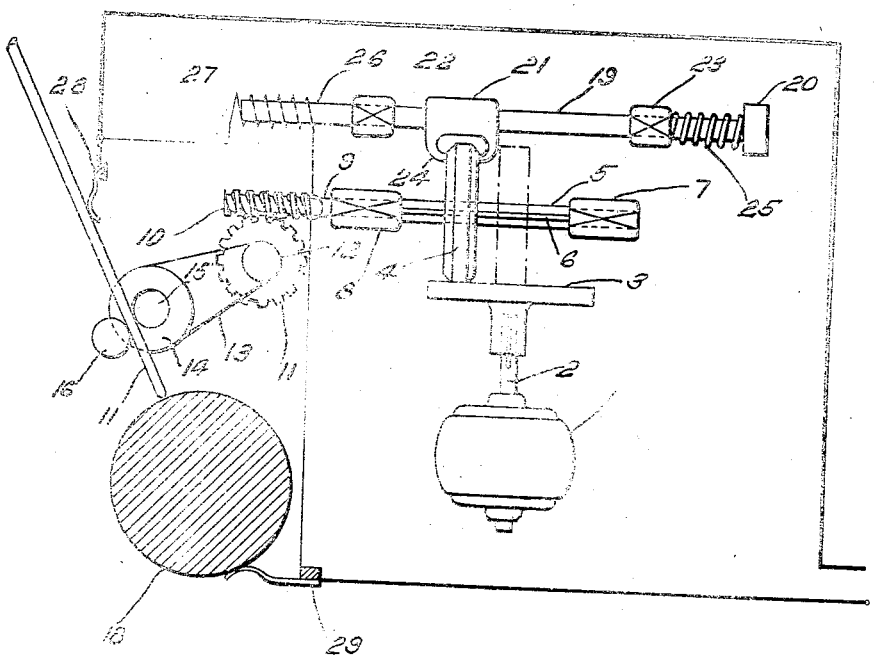
WITNESSES:
INVENTOR
Walter H. Himes.
BY
ATTORNEY Patented Apr. 28, 1925.

1,535,605

UNITED STATES PATENT OFFICE.

WALTER H. HIMES, OF PITTSBURGH, PENNSYLVANIA, ASSIGNOR TO WESTINGHOUSE ELECTRIC & MANUFACTURING COMPANY, A CORPORATION OF PENNSYLVANIA.

AUTOMATIC WELDING MACHINE.

Application filed January 26, 1921. Serial No. 439,914.

*To all whom it may concern:*

Be it known that I, WALTER H. HIMES, a citizen of the United States, and a resident of Pittsburgh, in the county of Allegheny and State of Pennsylvania, have invented a new and useful Improvement in Automatic Welding Machines, of which the following is a specification.

My invention relates to electric arc welding more especially to a welding mechanism which automatically feeds the welding electrode in relation to the objects to be welded.

It has been proposed to control the feeding of the electrode by means of a mechanism operated to intermittently feed the electrode relative to the rate of feeding the work.

Such apparatus usually consisted of a pair of grooved wheels placed in suitable relation for engaging an electrode, one of the wheels being actuated by a motor and the other wheel being mounted on a stud arbor secured to the armature of a solenoid. When the solenoid was energized to actuate its armature, the second wheel was drawn against the electrode, thus bringing it into intimate engagement with the driving wheel and causing it to feed the electrode downward. The solenoid was energized from the welding-current circuit and was controlled by making and breaking the circuit intermittently through cam-operated contacts geared to the rotating means for feeding the work.

Another scheme which has been proposed was to feed the electrode by a solenoid-actuated ratchet mechanism. When the solenoid was energized sufficiently to attract its armature, the electrode was fed by means of the ratchet.

Neither of these methods was satisfactory, however, since the electrode, in the one case, was fed forward at a constant rate, even though the electrode was not consumed proportionately, and irrespective of the length or size of the welding arc; and, in the other case, the mechanism lacked the necessary sensitiveness for proper operation of the system.

My invention obviates these difficulties, it being among the objects thereof to provide means for so automatically controlling the length of the welding arc by the rate of feeding the electrode as to obtain a uniform deposit.

In practising my invention, I provide means for controlling the feed of the electrode relative to the welding arc which comprises a constant-speed motor energized by an independent circuit, a variable-speed friction-drive mechanism co-operating therewith, and a solenoid-actuated shifting member to shift the driven member of the friction-drive mechanism relative to the speed required.

The solenoid is shunt connected across the welding arc, and its degree of energization is inversely as the resistance across the welding arc.

In the accompanying drawing forming a part hereof and in which like reference characters designate like parts, The single figure is a diagrammatic view of a welding system made in accordance with my invention and adapted for automatically welding parts together, or adding a deposit of metal to an object.

The apparatus comprises a constant-speed motor 1 having a shaft extension 2 and a friction disk 3 mounted thereon. The surface of the disk 3 is in contact with a friction wheel 4 of suitable material, such as fibre or leather, mounted on a shaft 5 which has a spline 6 and is supported by bearings 7 and 8. The shaft 5 is provided with an extension 9 having a worm 10 mounted thereon to engage a worm gear 11 that is secured to a pulley 12 which is connected, by a belt 13, to a pulley 14. A pair of friction wheels 15 and 16, one of which is secured to the pulley 14, are arranged to engage a fusible-metal electrode 17 to be advanced towards the work (which, in this instance, is a shaft 18).

Co-operating with the driving mechanism is a rod 19 having an enlargement 20 on one end and a shifting member 21 at an intermediate point and held in bearings 22 and 23 so that it is free to slide longitudinally along its axis. The shifting member 21 is provided with fork-like arms 24 which engage the sides of the friction wheel 4. A helical spring 25 is inserted between the enlarged portion 20 of the rod 19 and the bearing 23 to bias the wheel 4 toward its neutral position on the disk 3. (As shown in dotted lines in the drawing.) At the opposite end 26 of the rod 19, I provide a solenoid 27 which is connected across the contacts 28 and 29 in the welding circuit, in parallel with the arc.

The action of the mechanism is as follows:

The shaft 18 to be welded is rotatably mounted and the fusible electrode 17 is placed in contact therewith, thus forming a short circuit between the contacts 28 and 29. The welding circuit is energized by closing a switch (not shown). The contact between the electrode 17 and the article 18 is broken by raising the electrode slightly to form an arc.

The motor 1 is energized from an independent circuit of constant voltage to effect constant-speed rotation of the friction disk 3 and, through the wheel 4, to rotate the shaft 5. The worm 10 on the end of the shaft 5 actuates the worm wheel 11 and the pulley 12 to transmit motion, through the belt 13, to the pulley 14, thus causing the friction wheel 15 to feed the electrode 17 in the direction of the arc.

It is well known that the potential across an arc varies as the length of the arc and that the longer the arc the greater is the voltage across it. By shunting a solenoid 27 across the contacts 28 and 29, the variation in potential between these contacts will vary the strength of the field of the solenoid 27 to effect or permit longitudinal movement of the rod 19. As the voltage drops, the field of the solenoid becomes weakened, thus permitting the spring to move the rod toward its neutral position, and, as the voltage rises, the solenoid field overcomes the force exerted by the spring and moves the rod in the opposite direction.

Any variation in the voltage across the contacts, due to lengthening or shortening of the welding arc, will, therefore, result in shifting the wheel 4 to regulate the speed at which the electrode 17 is fed. Consequently, as the length of the arc increases, the voltage increases, producing a corresponding increase in the speed of feeding the electrode 17, thereby bringing the electrode closer to the welding surface and reducing the length of the arc. The speed at which the electrode 17 is fed may be varied by increasing the strength of the solenoid or that of the spring, thus varying the normal position of the friction wheel 4 in relation to the driving disk 3.

Although I have described a specific embodiment of my invention, it will be obvious to those skilled in the art that various changes may be made in the construction of my apparatus without departing from the principles thereof. For instance, I may move the work longitudinally on a drum or holder instead of revolving it or I may employ a direct-connected gear train in place of the belt drive. The variable-speed friction drive may be a slip-clutch drive or a cone-pulley-belt drive instead of the surface-contact friction-disc drive.

I claim as my invention:—

In an automatic electric welding machine, means for feeding an electrode controlled by the potential across the welding arc, said means comprising a constant-speed source of power, a variable-speed-electrode-feed drive, and an automatic device for regulating the speed of the feeding means.

In testimony whereof, I have hereunto subscribed my name this 14th day of January, 1921.

WALTER H. HIMES.